United States Patent [19]

Spinu

[11] Patent Number: 5,270,400
[45] Date of Patent: Dec. 14, 1993

[54] L,D-POLYLACTIDE COPOLYMERS WITH CONTROLLED MORPHOLOGY

[76] Inventor: Maria Spinu, 5 Doe Run Court, Apt. 2C, Wilmington, Del. 19808

[21] Appl. No.: 816,433

[22] Filed: Dec. 31, 1991

[51] Int. Cl.$^5$ .............................................. C08G 63/08
[52] U.S. Cl. ................................ 525/411; 528/354; 528/357
[58] Field of Search ................. 525/411; 528/354, 357

[56] References Cited

U.S. PATENT DOCUMENTS

| | | | |
|---|---|---|---|
| 2,878,236 | 3/1959 | Young et al. | 260/78.3 |
| 3,169,945 | 2/1965 | Hostettler et al. | 260/78.3 |
| 4,719,246 | 1/1988 | Murdoch et al. | 525/413 |
| 4,745,160 | 5/1988 | Chruchill et al. | 525/413 |

FOREIGN PATENT DOCUMENTS

| | | |
|---|---|---|
| 5060290 | 1/1990 | Australia . |
| 3911557 | 8/1989 | Fed. Rep. of Germany . |
| 59-27923 | 2/1984 | Japan . |
| 9001521 | 2/1990 | World Int. Prop. O. ........... 528/354 |

OTHER PUBLICATIONS

Leenslag, J. W., Pennings, A. J., "Makromol. Chem.," vol. 188, pp. 1809–1814 (1987).
Kohn et al., "J. Appl. Pol. Sci.," vol. 29, pp. 4265–4277 (1984).
Cohns, D., Younes, H., Maroon, G., "Polymer," vol. 28, p. 2018 (1987).
Dunsing, R., Kircheldorf, H. R., "Polymer Bulletin", vol. 14, pp. 491–495 (1985).
Keicheldorf et al., "Macromolecules", vol. 21, pp. 286–293 (1988).
Rafler, G., Dahlmann, J., "Acta. Polym.", vol. 41, No. 12, pp. 611–617 (1990).
Kricheldorf, H., et al., "Eur. Pol. J.", vol. 25, pp. 585–591 (1989).

*Primary Examiner*—James J. Seidleck
*Assistant Examiner*—Thomas Hamilton, III

[57] ABSTRACT

Linear block copolymers are disclosed. The polymers comprise a plurality of alternating polymeric blocks of amorphous copolymers of L-lactide and D-lactide with semicrystalline blocks of either L-lactide homopolymer or D-lactide homopolymer. The molecular weight can be built up by either of two techniques. The first technique is to use a chain extending agent such as a diacyl chloride or a diisocyanate to link a plurality of the preformed block copolymers. The second technique is to polymerize additional alternating amorphous and semicrystalline onto the original alternating block copolymers.

12 Claims, No Drawings

L,D-POLYLACTIDE COPOLYMERS WITH CONTROLLED MORPHOLOGY

BACKGROUND OF THE INVENTION

1. Field of the Invention

The present invention relates to a process for producing copolymers with controlled morphology. More specifically, the invention relates to copolymers having blocks of alternating amorphous and semicrystalline blocks of L-lactide, D-lactide and/or (L,D)-lactide to provide unique control of the copolymer melting temperature, degree of crystallinity and crystallization kinetics.

2. Description of the Related Art

The optically active enantiomers L-lactide and D-lactide are known to polymerize a variety of catalysts to produce the enatiomeric open-chain polymers with poly(L-lactide) and poly(D-lactide), respectively. For example, H. R. Kricheldorf et al., *Eur. Pol. J.*, Vol. 25 (1989). pp 585–591 discuss polymerization of L-lactide with Sn(II) and Sn(IV) halogenides. J. W. Leesiang and A. J. Pennings, *Makromol. Chem.*, 188, (1987), pp 1809–1814 discuss preparation of high molecular weight poly(L-lactide) using 2-ethylhexanoate cartalyst. Polymerization of L-lactide by means of magnesium salts is discussed by R. Dunsing and H. R. Kricheldoef, *Polymer Bulletin*, Vol. 14 (1985), pp 491–495. H. R. Kricheldorf et al., *Macromolecules*, Vol. 21 (1988), pp 286–293 discuss polymerization of L-lactide and other lactones with metal alkoxide catalysts. F. E. Kohn et al., *J. Appl. Pol. Sci.*, Vol. 29 (1984), pp 4265–4277 discuss polymerization of D,L-lactide initiated with tetrphenyltin and G. Rafler et al., Acta Polym., Vol. 41 (1990), pp 611–617 presents a review on polymerization of D,L-lactide with cationic, anionic and non-ionic catalysts. The poly(L-lactide) and poly(D-lactide) are described in the literature as being semicrystalline with melting point about 175° C., whereas poly(D,L-laxctide) is amorphous.

Australian Published Patent Application No. 50602/90 discloses poly(ester-silicone) block copolymers wherein the polyester is formed from repeating lactide residue groups, repeating glycolide groups or mixtures thereof.

German Offenlegungsschrift DE 391157 discloses block copolymers wherein one type block is formed from an aliphatic polycarbonate and the other type block is a polylactone or a copolymer of a lactone and a carbonate.

Japanese Patent Application No. 59-27923 discloses poly(ether-ester) block copolymers. The polyether blocks and polyester blocks are randomly arranged along the product polymer chains.

In U.S. Pat. Nos. 2,878,236 and 3,169,945, lactone polyesters are described wherein the lactone starting material is identified as having at least six carbon atoms to avoid a tendency for the resulting polymer to revert to the monomer.

The relative high melting points for poly(L-lactide) and poly(D-lactide) require relatively high processing temperatures (greater than 185° C.) which translates into a very narrow processing window for such polymers (since chain scissions with decrease in molecular weight occur above 180° C.). For practical purposes, lower melting temperatures (broader processing window) are desired. Traditionally, melting point depression in polylactides has been achieved by copolymerizing a controlled amount of the opposite enantiomer. This method introduces lattice defects in the homopolymers which translates to less perfect crystalization and lower melting temperature. Random copolymers of the enantiomeric lactide are crystalline only when over 90% of the enanitiomer is present. The melting points decrease from about 175° to 124° C. as composition changes from pure enantiomer to 8% of the opposite enatiomer. The decrease in the melting point of such random lactide copolymers is unfortunately accompanied by a considerable decrease in the degree of crystallinity and crystallization rate, which makes thase copolymers unsuitable for injection molding applications.

The melting point of semicrystalline polymers is also dependent on the molecular weight. A general review of this subject is given by D. Cohn, H. Younes, and G. Macrom, *Polymer*, Vol. 28 (1987) wherein the morphological behavior of semicrystalline polylactide with different molecular weights is described. The melting temperature ($T_m$) and the degree of crystallinity ($X_c$) is shown to increase with molecular weight: $T_m$ increases from 135° to 170° C. and $X_c$ increases from 12.2 to 37% when th number average molecular weight ($M_n$) increases from 1,000 to 28,000 g/mole. However, no information on the crystallization rates are given in this paper.

SUMMARY OF THE INVENTION

The present invention provides a process for producing high molecular weight polylactide with controlled $T_m$ (in the range of 140°–175° C.) and controlled crystallization behavior (both the crystallization rate and extent of crystallization). Such structures are achieved through a microphase separated morphology in which amorphous and semicrystalline polylactide blocks alternate to form a multiblock structure. The resulting copolymers have superior physical properties characteristic of high molecular weight polylactides, while their crystallization behavior ($T_m$, $X_c$, and rate of crystallization) is controlled by the length of the semicrystalline blocks which can be adjusted during the synthesis. The amorphous polylactide blocks are copolymers of L-lactide and D-lactide containing at least 15% of the opposite enantiomer, or L,D-lactide (meso-lactide). The semicrystalline blocks are poly(L-lactide) or poly(D-lactide).

The polymers are prepared by sequential block building; i.e., copolymerizing a mixture of L-lactide and D-lactide or L,D-lactide onto a difunctional compound containing hydroxy or amine groups, followed by homopolymerizing L-lactide or pure D-lactide onto both ends of the copolymer block. The molecular weight can then be increased by either sequential additional copolymerizations and homopolymerizations or through the use of chain extenders to link the preformed blocks together. The overall structure is therefore an alternating multiblock polylactide copolymer.

DETAILED DESCRIPTION OF THE PREFERRED EMBODIMENTS

The present invention involves starting with a compound of the formula X—I—X where —X is —OH or —NH$_2$ and —I— is an organic group containing 2 to 100 carbon atoms. Suitable —I— groups are divalent aliphatic or cycloaliphatic groups which preferably contain from 2 to 12 carbon atoms. Also suitable —I— groups are derived from polyethers of the formula HO—(R—O)$_n$H where —R— is an alkylene group containing 2 to 6 carbon atoms and n is a number from 2 to 20.

The compound X—I—X is reacted with a mixture of 10 to 90% L-lactide and 90 to 10% D-lactide, with 15 to 85% L-lactide and 85 to 15% D-lactide being preferred range to form two amorphous polylactide blocks each of which has a molecular weight of 500 to 20,000. The mixture of L- and D-lactide-monomers is allowed to polymerize until at least 95% of the monomers have polymerized, after which L- or D-lactide is added to the reaction mixture. The L- or D-lactide is 98-100% L-lactide or 98-100% D-lactide to ensure that the block it forms is semicrystalline. At this point the polymer has the structure HOBAIABOH where I is the residue of the diamine, or dihydroxy compound as defined above, the As are the amorphous L-lactide-D-lactide copolymer blocks as described above and the Bs are the semicrystalline L-lactide or D-lactide which have molecular weights of 1,000 to 40,000 homopolymer blocks. At this point it is desired to increase the molecular weight to 10,000 to 300,000. This can be done by either of two techniques or a combination thereof. One of the techniques is to add a chain extension agent to the reaction mixture to link together a plurality of the HOBAIABOH polymers. Suitable chain extension agents include diisocyanates such as toluene diisocyanate and diacyl chlorides such as terephthaloyl chloride. Generally, the a diisocyanate or diacyl chloride will contain from 8 to 20 carbon atoms. The resulting polymer has the formula ROBAIAB—XBAIABX)$_y$BAIABOR where X is the residue from the diacyl chloride or diisocyanate, —R is —H, chain extender residue or a capping group such as —C(O—R' where R' is alkyl or aryl of up to 20 carbon atoms, and y is 1 to 100.

Alternatively, additional alternating A and B blocks can be polymerized onto the HOBAIABOH polymer to form polymers of the formula RO(BA$_m$I—AB)$_m$OR where A, B, R and I have the meaning defined above and m is 2 to 10 and preferably 2 to 6. The reason for the preferred upper limit of 6 is that ester interchange reactions can begin to occur if the polymer is left in contact with the catalyst for too long a time at elevated temperatures.

The lactide polymerization is done using a lactide ring opening catalyst such as stannous 2-ethylhexanoate (tin octanoate) or a yttrium or lanthanide series rare earth metal based catalyst such as described in U.S. Pat. No. 5,028,667. The polymerization generally is done at 0° to 200° C. with 110° to 150° C. being the preferred range. The polymerization may be done in solution or in the melt without a solvent. The final multiblock copolymers of the present invention generally melt in the range of 130° to 175° C.

The chain extending reaction can be done in bulk or in solution the same as the lactide polymerization reaction. The molar ratio of HOBAIABOH to chain extender should be 1:1. Suitable temperatures for the chain extending reaction are 25° to 180° C. with 110° to 150° C. being the preferred range. Suitable solvents for the lactide polymerization and chain extending reactions should be non-reactive organic liquids capable of dissolving at least 1 wt % of the product polymer at 25° C. Toluene and the xylenes are preferred solvents. The product polymers generally have number average molecular weights of 10,000 to 300,000 with 40,000 to 200,000 being the preferred range.

The polylactide is biodegradable. By varying the size of the B blocks, the melting temperature of the final block copolymer can be varied from 130° to 175° C. The plastics of the present invention find use as general purpose molding and packaging resins.

EXAMPLE 1

Multi-step, sequential monomer addition

Step 1 (amorphous L/D Polylactide blocks)

In a dry box, 5.0 g (34.722 mmoles) L-Lactide, 1.3 g (9.027 mmoles) D-Lactide, and 0.80 g (1.231 mmoles) hydroxyl terminated polytetramethylene-oxide (PTMO) initiator (M$_n$=650 g/mole) are weighed into an oven dried 100 ml. 3-necked round bottom flask equipped with an overhead stirrer. The reaction flask is then transferred in a hood, placed under an inert atmosphere, and heated to 120° C. for 2 hours, without catalyst, to initiate ring opening of lactide by OH endgroups of the PTMO initiator. After 2 hours, the reaction temperature is increased to 150° C. and 0.20 ml SnOct solution, 0.1M in toluene, is added (monomer/catalyst=2000/1). The reaction is allowed to proceed for 1 hour at 150° C. during which time a moderate viscosity increase is observed. A reaction sample at this stage shows: T$_g$=29° C. as determined by differential scanning calorimetry (DSC); NoT$_m$ (amorphous polymer); M$_p$=31,300 g/mole as determined by gel permeation chromatography using a polystyrene standard (GPS,PS STD);

Step 2 (semicrystalline L-polylactide PLA blocks)

Under inert atmosphere, add 6.6 g (45.83 mmoles) L-Lactide to the previous reaction mixture. When all new monomer is dissolved and the reaction is homogeneous again, add 0.22 ml SnOct, 0.1M in toluene, (M/Cat=2000/1). The reaction viscosity starts increasing shortly after second catalyst addition and throughout the reaction. React for 15 minutes. A reaction sample at this stage shows: T$_g$=46° C. (DSC); T$_m$=159° C.; degree of crystallinity about 21%; M$_p$=76,800 g/mole (GPC, PS STD);

Step 3 (amorphous L/D Polylactide blocks)

Under inert atmosphere add 3.0 g (20.833 mmoles) L-Lactide, and 1.6 g (11.111 mmoles) D-Lactide to the above reaction mixture. When all new monomer portion dissolves and the reaction mixture becomes homogeneous again (about 5 min.) add 0.16 ml SnOct solution, 0.1M in toluene, (M/Cat=2000/1) and allow to react for 15 minutes. A reaction sample at this stage shows: T$_g$=46° C. (DSC); T$_m$=150° C., degree of crystallinity about 14%; M$_p$=100,000 g/mole (GPC, PS STD);

Step 4 (semicrystalline L-PLA blocks)

Under inert atmosphere add 6.6 g (45.83 mmoles) L-lactide to the previous reaction mixture and dissolve the new monomer portion. When the reaction mixture is homogeneous again, add 0.22 ml SnOct, 0.1M in toluene, (M/Cat=2000/1). The reaction viscosity increases considerably shortly after the new catalyst addition, and stirring becomes difficult. React for 15 minutes, cool the reaction mixture to room temperature, and dissolve it in 200 ml CH$_2$Cl$_2$. The polymer was isolated by precipitation from hexane, and dried in a vacuum oven at room temperature for at least 24 hours.

Characterization:

$T_g=46°$ C.(DSC); $T_m=130°$ C.; degree of crystallinity=9.3%; $M_p=122,000$ g/mole (GPC, PS STD);

EXAMPLE 2

Two-step, sequential monomer addition followed by chain extension

Step 1 (amorphous L/D polylactide block)

In a dry box, 5.0 g (34.722 mmoles) L-Lactide, 1.3 g (9.027 mmoles) D-Lactide, and 0.80 g (1.231 mmoles) hydroxyl terminated PTMO initiator (Mn=650 g/mole) are weighed into an oven-dried 100 ml 3-necked round bottom flask equipped with an overhead stirrer and an addition funnel. The reaction flask is then transferred in a hood, placed under an inert atmosphere, and heated to 120° C. for 2 hours, without catalyst, to initiate ring opening of lactide by OH endgroups of the PTMO initiator. After 2 hours, the reaction temperature is increased to 150° C. and 0.20 ml SnOct solution, 0.1M in toluene, is added (M/Cat.=2000/1). The reaction is allowed to proceed for 1 hour at 150° C. during which time a moderate viscosity increase is observed. A reaction sample at this stage shows: $T_g=23°$ C.(DSC); No $T_m$(amorphous polymer); $M_p=11,700$ g/mole (GPC, PS STD);

Step 2(semicrystalline polylactide blocks)

Under inert atmosphere, add 18.9 g (131.25 mmoles) L-lactide to the previous reaction mixture. When all new monomer is dissolved and the reaction is homogeneous again, add 0.66 ml SnOct 0.1M in toluene (M/Cat=2000/1). The reaction viscosity starts increasing shortly after catalyst addition and throughout the reaction. React for 1 hour. A reaction sample at this stage shows: $T_g=40°$ C. (DSC); $T_m=156°$ C., degree of crystallinity about 25%; $M_p=40,800$ g/mole (GPC, PS STD);

Step 3 (chain extension)

5 ml toluene and 0.11 ml (0.772 mmoles, 5% excess) toluene diisocyanate (TDI) were syringed into the addition funnel, and the TDI solution was added drop-wise into the reaction mixture, over 30 minutes. During TDI addition, the reaction viscosity increased considerably and small amount of freshly distilled toluene (15 ml) were added to keep the reaction stirring. At the end of TDI addition, the reaction mixture was cooled to room temperature and dissolved in 200 ml $CH_2Cl_2$. The polymer was isolated by precipitation from hexane, and dried in a vacuum oven at room temperature for at least 24 hours.

Characterization:
$T_g=54°$ C.(DSC); $T_m=151°$ C.; $M_p=73,000$ g/mole (GPC, PS STD).

Having thus described and exemplified the invention with a certain degree of particularity, it should be appreciated that the following claims are not to be so limited but are to be afforded a scope commensurate with the wording of each element of the claim and equivalents thereof.

I claim:

1. A copolymer of the formula HOBAIABOH where A is a copolymer of 10 to 90 weight percent L-lactide and 90 to 10 weight percent D-lactide, B is a polylactide formed from 98 to 100 weight percent L-lactide or 98 to 100 weight percent D-lactide, and —I— is the residue of a diamine or diol containing 2 to 100 carbon atoms.

2. The copolymer of claim 1 wherein copolymer segments A have a number average molecular weight of 500 to 20,000.

3. The copolymer of claim 2 wherein polymer segments B have a number average molecular weight of 1,000 to 40,000.

4. The copolymer of claim 3 wherein the copolymer segments A are 15 to 85 weight percent L-lactide units and 85 to 15 weight percent D-lactide units.

5. The copolymer of claim 4 wherein —I— has the formula $(OR)_n$ where —R— is an alkylene group containing 2 to 6 carbon atoms and n is 2 to 20.

6. The copolymer of claim 5 wherein —R— is an alkylene group containing 4 carbon atoms.

7. A copolymer of the formula $HO(BA)_mI(AB)_mOH$ where A is a copolymer of 10 to 90 weight percent L-lactide and 90 to 10 weight % D-lactide, B is a polylactide formed from 98 to 100 weight percent L-lactide or 98 to 100 weight percent D-lactide, m is 2 to 10, and —I— is the residue of a diamine or diol containing 2 to 100 carbon atoms.

8. The copolymer of claim 7 wherein copolymer segments A have a number average molecular weight of 500 to 20,000.

9. The copolymer of claim 8 wherein polymer segments B have a number average molecular weight of 1,000 to 40,000.

10. The copolymer of claim 9 wherein the copolymer segments A are 15 to 85 weight percent L-lactide units and 85 to 15 weight percent D-lactide units.

11. The copolymer of claim 10 wherein —I— has the formula $(OR)_n$ wherein —R— is an alkylene group containing 2 to 6 carbon atoms and n is 2 to 20.

12. The copolymer of claim 11 wherein —R— is an alkylene group containing 4 carbon atoms.

* * * * *